(No Model.)
J. A. GRASSMAN.
HAY RACK.
No. 337,321.  Patented Mar. 2, 1886.
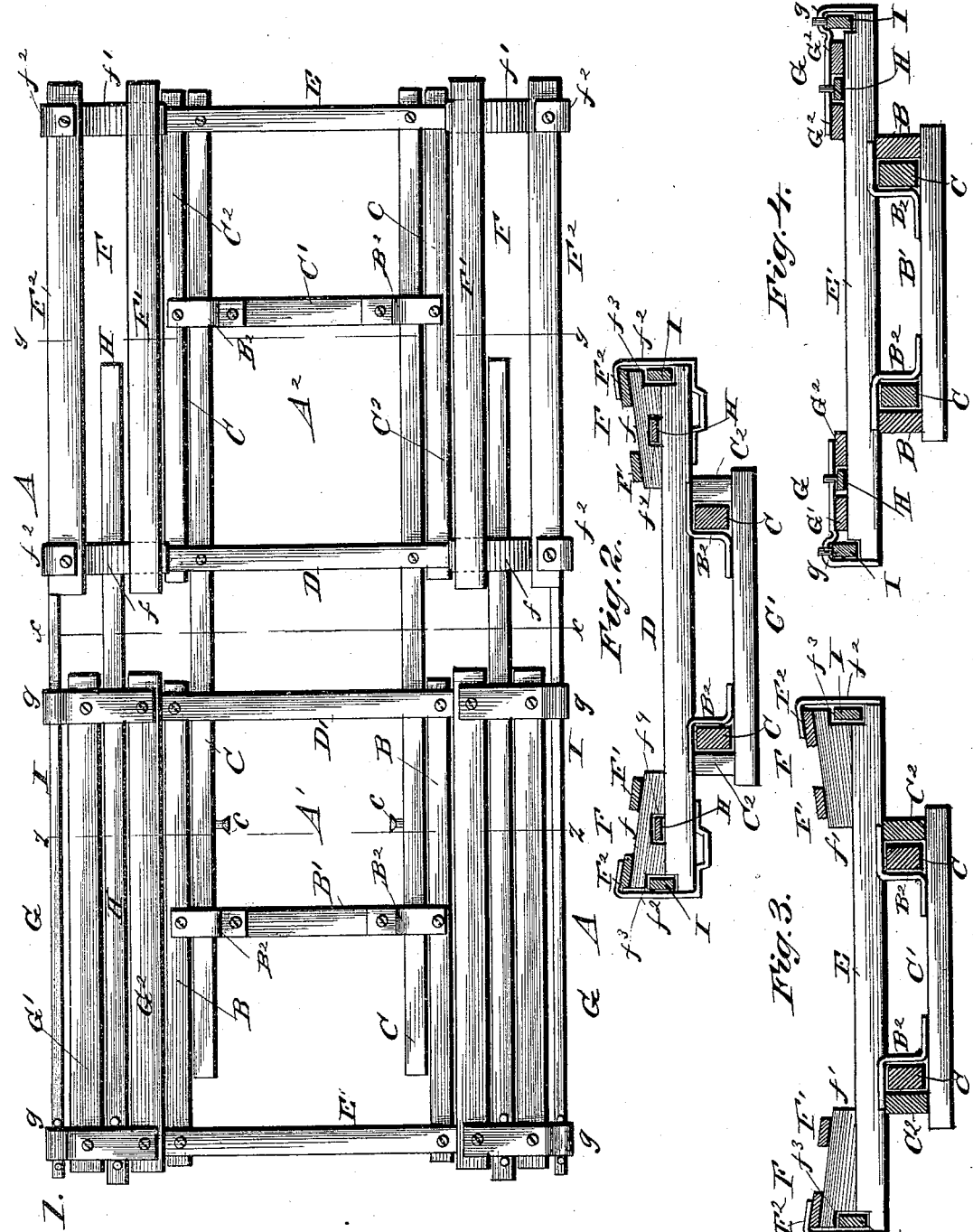
WITNESSES
INVENTOR
John A. Grassman
By Wm. Alexander, Attorney

UNITED STATES PATENT OFFICE.

JOHN A. GRASSMAN, OF HENRY, ILLINOIS.

HAY-RACK.

SPECIFICATION forming part of Letters Patent No. 337,321, dated March 2, 1886.

Application filed November 23, 1885. Serial No. 184,188. (No model.)

*To all whom it may concern:*

Be it known that I, JOHN A. GRASSMAN, of Henry, in the county of Marshall and State of Illinois, have invented certain new and useful Improvements in Hay-Racks; and I do hereby declare that the following is a full, clear, and exact description thereof, reference being had to the accompanying drawings, and to the letters of reference marked thereon, which form part of this specification, in which—

Figure 1 is a plan view of the hay-rack complete. Fig. 2 is a transverse section of the same on line $x\ x$, Fig. 1. Fig. 3 is a similar figure on line $y\ y$, Fig. 1; Fig. 4, a sectional view on line $z\ z$, Fig. 1.

This invention relates to improvements in hay-racks adapted to be attached to wagons, the object being to make the rack longitudinally adjustable, so that its length can be changed to accommodate wagons of different sizes, and to make the rear end of the rack higher than the front end, so that in loading the hay will pack on and be supported by the said rear end, and will be in less danger of falling off the rack.

The invention consists in the arrangement and novel construction of parts hereinafter described, and pointed out in the appended claim.

Referring to the accompanying drawings by letter, A designates the frame of the rack, composed of the two parts, $A'\ A^2$, which slide upon each other, and are hereinafter separately described.

The part $A'$ is provided with the longitudinal bars B B on each side of and equally distant from its central longitudinal line, and the transverse bar $B'$, connecting the said bars together and adapted to be secured by bolts or otherwise to the front axle of a wagon.

$B^2\ B^2$ are brackets, preferably of metal, which secure the ends of the bars B to the bar $B'$, and which also serve as guides and directors for certain bars belonging to the part $A^2$, and hereinafter described.

C C are longitudinal bars of the part $A^2$. The said bars are connected together by the transverse bar $C'$, adapted to be secured to the rear axle of the wagon, and each lies against the inner side of one of the bars B of the part $A'$. The bars C pass through the directing-brackets $B^2$, so that the part $A^2$ can easily slide inward and outward on the part $A'$.

$c\ c$ are stops on the inner surfaces of the bars C, which are arranged to strike against the brackets and stop the motion of the parts.

$C^2\ C^2$ are longitudinal bars secured to the outer side of the bars C, and arranged to have their ends abut against the ends of the bars B, so as to stop the inner motion of the part $A^2$ on the part $A'$.

D is a transverse bar secured to the bars C C near the inner ends of the bars $C^2$, and $D'$ is a similar bar secured to the bars B near their inner ends. The said bars D D' approximate each other when the parts $A'\ A^2$ are closed up on themselves, and lie equally distant from the central transverse line of the rack.

E is a transverse bar, similar to the bar D, but secured across the outer ends of the bars C C of the part $A^2$, and $E'$ is a similar bar secured across the outer end of the bars B of the part $A'$.

Outside of the bar $C^2$, on each side of the rack-frame $A^2$, is a frame, F, composed of the longitudinal bars $F'\ F^2$, the bolsters $f\ f'$, secured, respectively, on the upper surfaces of the bars D and E, and the end brackets, $f^2\ f^2$, preferably of metal, connecting the ends of the bars D and E to the outer bars, $F^2$, of the frame F. The bolsters $f'\ f'$ are provided with recesses $f^3\ f^3$ on their outer surfaces, which recesses serve as guides for bars secured to the parts $A'$, and hereinafter described. The brackets $f^2$ on each side aid in forming the said guides.

The bolsters $f$ are provided on their under surfaces with notches $f^4$, and both bolsters $f\ f'$ have their upper surfaces inclining downward from their outer ends, causing the frames F to also incline downward from their outer edges. By this the hay is more easily retained on the rack.

Outside of the bars B of the part $A'$, on each side of the same, is a frame, G, composed of the outer and inner bars, $G'\ G^2$, and the brackets $g$, preferably of metal, which connect the ends of the bars $D'\ E'$ to the upper surfaces of the bars $G'\ G^2$.

H H are guide-bars lying between the bars $G'\ G^2$ of each frame G and secured to the bars $D'\ E'$ and to the brackets $g$. The said bars fit and slide in the recesses $f^4$ of the brackets $f$, heretofore described.

I I are guide-bars secured to the ends of bars

D' E', and sliding in the guides formed by the recesses in the bolsters $f'$ and the brackets $f^2 f^2$ of the frames F F of the part $A^2$. The said guide-bars aid in directing the part A' on the part $A^2$ as the former slides over the latter. The bolsters $f f'$ raise the general surface of the part $A^2$ above that of the part A', so that when the hay is packed on from the front of the rack it will be better supported thereon than if the parts had their general level of the same height. The part $A^2$, by its movement on the part A', allows the rack to be attached to wagons having their front and rear axles different distances apart and to accommodate different-sized loads of hay.

The strips B B may, if desired, be arranged to lie inside of the strips C C; but the described construction is preferable.

Instead of bolsters $f f f$, pivoted blocks may be used, which are of advantage in making a short turn.

Having described my invention, I claim—

The combination, in a hay-rack, of the front part, A', provided with the bars B B', guide-brackets $B^2$, transverse bars D' and E', and non-inclined frames G, composed of the bars G' $G^2$ and brackets $g$, with the rear part, $A^2$, provided with the bars C C' $C^2$, transverse bars D E, inclined frames F, composed of the bars F' $F^2$, brackets $f^2 f^2$, and bolsters $f f'$, and the guide-bars H and I, secured to the front part, A', all constructed and arranged substantially as and for the purpose set forth.

In testimony that I claim the foregoing as my own I affix my signature in presence of two witnesses.

JOHN A. GRASSMAN.

Witnesses:
WM. H. KIMBES,
SAMUEL P. CLEMENS.